Feb. 17, 1931.  L. C. LEWIS  1,792,695
SHOCK ABSORBER
Original Filed June 13, 1928
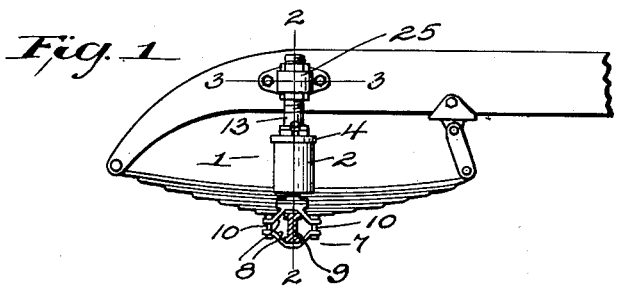
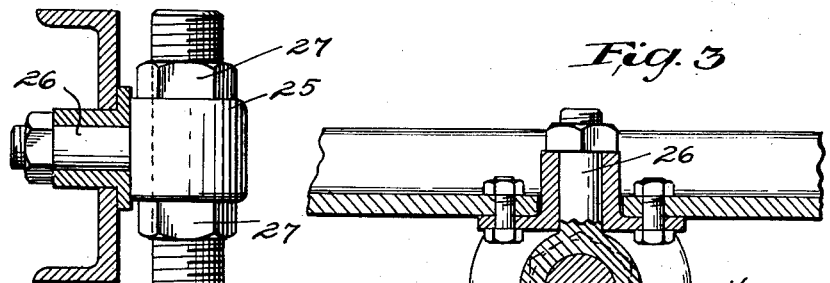
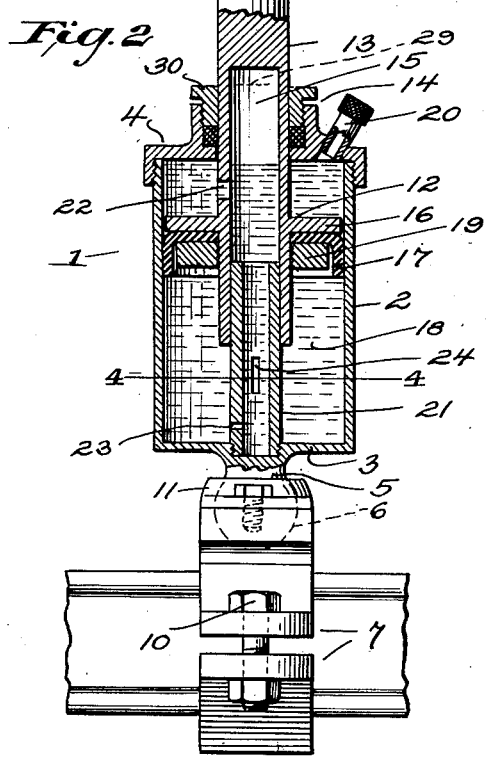
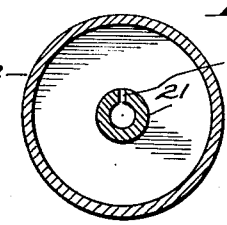
Inventor
*Lewis C. Lewis*
By *W. S. McDowell.*
Attorney Patented Feb. 17, 1931

1,792,695

UNITED STATES PATENT OFFICE

LEWIS C. LEWIS, OF COLUMBUS, OHIO, ASSIGNOR TO MARTIN C. WESTFALL, OF COLUMBUS, OHIO

SHOCK ABSORBER

Application filed June 13, 1928, Serial No. 285,152. Renewed January 16, 1931.

This invention relates to improvements in motor vehicle shock absorbers and has particular reference to shock absorbers of the type employing a liquid to yieldingly check the shock due to relative movement between the frame and axle mechanism of a motor vehicle.

In accordance with the present invention a shock absorber is provided which consists of a cylinder carried by the axle structure of a motor vehicle and within which is arranged for sliding movement a piston which is connected with the frame structure of a motor vehicle, said cylinder being provided with a liquid which, upon movement of the piston within the cylinder, is transferred or circulated from one side of the piston within the cylinder to the other side, there being ports or restricted passages provided within said cylinder for the purpose of regulating the circulation of said liquid and thereby controlling the response of the piston to the applied thrusts developed by the road operation of a motor vehicle.

It is another object of the invention to provide a shock absorber of simple, substantial and practical design which may be readily applied to a motor vehicle and which when in operation is flexibly connected with the frame and axle structures so as to be readily adapted to the complex relative movements which are set up between the axle and the frame of a motor vehicle.

With these and other objects in view which will appear as the description proceeds, the invention consists in the novel features of construction, combinations of elements and arrangements of parts hereinafter to be fully described and pointed out in the appended claims.

In the accompanying drawings:

Figure 1 is a side elevation of a shock absorber constructed in accordance with the present invention, Figure 2 is a vertical sectional view on the line 2—2 of Figure 1, Figure 3 is a horizontal sectional view on the line 3—3 of Figure 1, Figure 4 is a horizontal sectional view taken on the line 4—4 of Figure 2.

Referring more particularly to the drawings, the numeral 1 designates my improved shock absorber in its entirety. In this instance the absorber is formed to include a cylinder 2, which is provided with a lower closed end 3 and an open upper end, the latter being exteriorly threaded for the reception of a flanged closure 4. The lower end 3 of the cylinder is provided centrally and axially with a spherical head 5, which is seated within a substantially spherical socket 6 provided in connection with the upper of a pair of clamping members 7. These members are provided with complemental beveled or inclined surfaces 8, which receive between them the axle 9 of a motor vehicle. The front axle of a vehicle has been illustrated, but it will be understood that owing to the construction of the surfaces 8 the latter are readily adapted to clamp the circular or tubular type of axle commonly found in connection with the rear drive of a motor vehicle. The clamping members 7 are adapted to be drawn into clamping engagement with an axle by means of bolts and nuts 10, the bolts being situated in registered openings provided in the outer end portions of the clamps 7. The upper of the clamping members 7 is provided with a removable cap section 11 which constitutes the upper portion of the ball socket 6.

Arranged for vertical sliding movement within the cylinder 2 is a piston 12. This piston includes a stem or rod 13 which extends vertically and axially through the upper portion of the cylinder. The closure 4 is provided with a packing gland 14 which is adapted to firmly surround the stem or rod 13 to prevent oil seepage past the piston rod. Within the cylinder the piston rod is of hollow tubular form and includes an internal chamber 15, open to the lower end of the stem or rod and provided with a closed upper end. The stem or rod is provided within the cylinder with an annular collar 16 and approximately of a diameter conforming with the inner diameter of the cylinder 2. Co-operative with the fixed metallic collar 16 is a flexible piston section 17, which has its outer portion turned downwardly to firmly engage with the inner walls of the piston to prevent particularly uncontrolled seepage of the liquid body 18 within the cylinder past the piston. The lower portion of the stem 13 is threaded for the reception of a nut 19, which in combination with the collar 16 and the section 17 produces the composite piston. The nut 19 is adapted to engage with the flexible section 17 so as to retain the latter in its applied operative position.

Liquid, such as glycerine or other incompressible fluids, is introduced into the interior of the cylinder by way of a filling pipe 20 carried in connection with the closure 4 so that normally the entire cylinder is filled with liquid. Arising from the bottom of the cylinder and adapted to telescope into the hollow stem or rod 13 is a fixed tubular section 21, which is closed at its lower end and open at its upper end into the chamber 15. Above the piston the stem or rod 13 is provided with a relatively enlarged port 22, which establishes communication between the interior of the cylinder 2 and the chamber 15. Likewise, the tubular section 21 at its extreme lower portion is provided with a restricted passage 23 of materially less diameter than the port 22. Above the passage 23 and normally below the stem 13 is an elongated slot 24 which is used, in combination with the passage 23, to control liquid flow from the interior of the cylinder into the tubular section 21 or vice versa.

In operation, it will be seen that when the piston 12 moves downwardly in the cylinder (or if the cylinder 2 moves upwardly relative to the piston) the liquid within said cylinder and disposed below said piston is forced through the passage 23 and the slot 24 into the interior of the fixed stem 21 and thence upwardly into the chamber 15 and by way of the port 22 to the upper side of the cylinder. However, as the stem or rod 13 continues its descent the lower portion thereof first partially covers and then fully covers the slot 24 so as to arrest liquid flow through this orifice. This results in causing all of the liquid to flow through the restricted port 23, and since this port is of relatively small diameter, and an incompressible fluid is used the rate of flow through the passage 23 is so regulated as to arrest or check further descent of the piston. In fact, this checking or arresting action is of a gradually increasing character due to the fact that the slot 24 has its effective area gradually diminished and in some instances entirely closed by the descent or relative movement of the stem 13. The chamber 15 extends some distance above the port 22 for the purpose of producing an air trapping chamber. Thus due to the pressure exerted by the rising column of liquid in the chamber 15 and the fact that the liquid is restricted in its flow through the port 22, the air entrapped in the upper part of the chamber 15 is compressed by the liquid column, and this compressed air is employed also to yieldingly absorb shock and shock relative movement between the axle and frame of an associated motor vehicle. The shock absorber operates effectively when the piston moves in either direction within the cylinder and may thus be said to be "double acting" in its operation. When the piston moves upwardly in the cylinder the liquid is forced out through the port 22 and thence through the port 23 into the bottom of the cylinder. After the piston moves upwardly a certain distance the slot 24 is uncovered to a gradually increasing extent until normal operation is obtained. On the upward movement of the piston air is also compressed in the upper portion of the chamber 15 to supplement the checking influence of the liquid body.

The solid upper portion of the stem 13, exteriorly of the cylinder 2, is threaded and received within a coupling 25 pivotally supported upon the frame of a motor vehicle. The stem 13 may be adjusted by the provision of tightening nuts 27 whereby the effective positions of the piston within the cylinder 2 may be regulated. Preferably, the stem 13 is provided exteriorly with a scored line 29. When this line is in registration with the upper surfaces of the packing nut 30, carried by the closure 4, a proper operating position of the piston is obtained.

While I have described what I believe to be the preferred form of the invention nevertheless it will be understood that the drawings and the above description are in a sense illustrative and explanative and various changes may be made in the invention from the form thereof herein specifically set forth without departing from the spirit and scope of the invention as the latter has been defined in the following claims.

What is claimed is:

1. In a shock absorber, a cylinder, a piston mounted for reciprocation within said cylinder, a tubular stem connected with said piston and extending longitudinally through one end of the cylinder, said stem being provided with a port above said piston permitting of the circulation of a liquid therethrough, an open top tubular section carried by and rising stationarily from the bottom of said cylinder and provided with a restricted port located near the bottom of said section, and an orifice above said restricted port, said orifice being so disposed that upon relative movement between said cylinder and piston said orifice may have its effective area varied by co-operation with said stem to regulate the rate of liquid flow from one side of said piston to the other.

2. In a shock absorber, a liquid receiving cylinder, a piston slidably mounted within said cylinder, a stem fixed to said piston and arranged to slidably project through one end of said cylinder, said stem being provided with an internal chamber open at the lower end of the stem, the opposite end of said chamber being closed or blind, a port arranged above said piston and establishing communication between the interior of said cylinder and the intermediate portion of said chamber, and a fixed tubular section rising centrally from the bottom of said cylinder and slidably received within said chamber, said section being provided with a fixed port adjacent to the lower end of said cylinder and with an orifice above said port and normally below said stem, said orifice being so situated that upon relative movement between the piston and cylinder said stem will be moved to positions varying the effective area of said orifice.

3. In a shock absorber, a cylinder, a piston mounted for reciprocation within said cylinder, a stem connected with said piston and provided at its lower end with an axially extending chamber, said chamber opening to the lower end of said stem and having its upper end closed, there being a port provided in said stem above said piston which establishes communication for liquid flow between the upper part of said cylinder and the intermediate portion of said chamber, a fixed tubular section rising axially and stationarily from the lower part of said cylinder and having the upper portion thereof telescopingly received within the chamber of said stem, said section being provided with a fixed port near the bottom of said cylinder and with an orifice above said port, said orifice being so situated that upon relative movement between said cylinder and piston said orifice will have its effective area varied being covered to a greater or lesser extent by said stem for the purpose of varying the rate of liquid flow from one side of said piston to the other, the flow of liquid through said tubular section and stem serving to compress air located in the closed upper part of said chamber.

In testimony whereof I affix my signature.

LEWIS C. LEWIS.